United States Patent [19]

Dufour et al.

[11] Patent Number: 4,508,870

[45] Date of Patent: Apr. 2, 1985

[54] POLYBLENDS OF THERMOPLASTIC COPOLYETHERESTERS AND ACRYLONITRILE-BUTADIENE-STYRENE POLYMERS

[75] Inventors: Daniel L. Dufour, Waterloo, Belgium; William J. Jones, Holyoke, Mass.

[73] Assignee: Monsanto Company, St. Louis, Mo.

[21] Appl. No.: 574,445

[22] Filed: Jan. 27, 1984

[51] Int. Cl.$^3$ ............................................. C08L 55/02
[52] U.S. Cl. ........................................ 525/64; 525/92
[58] Field of Search .................................... 525/64, 92

[56] References Cited

U.S. PATENT DOCUMENTS 4,234,701 11/1980 Abolins ................................. 525/68
4,346,195 8/1982 Hornbaker .......................... 525/176

FOREIGN PATENT DOCUMENTS 53-00252 1/1978 Japan .

*Primary Examiner*—John C. Bleutge
*Assistant Examiner*—Patricia Short
*Attorney, Agent, or Firm*—Linda L. Lewis; William J. Farrington; Paul D. Matukaitis

[57] ABSTRACT

Molding compositions are prepared from blends of (A) a thermoplastic copolyetherester elastomer; and (B) an ABS or MBS polymer. Such blends have improved ductility and chemical resistance.

10 Claims, 2 Drawing Figures

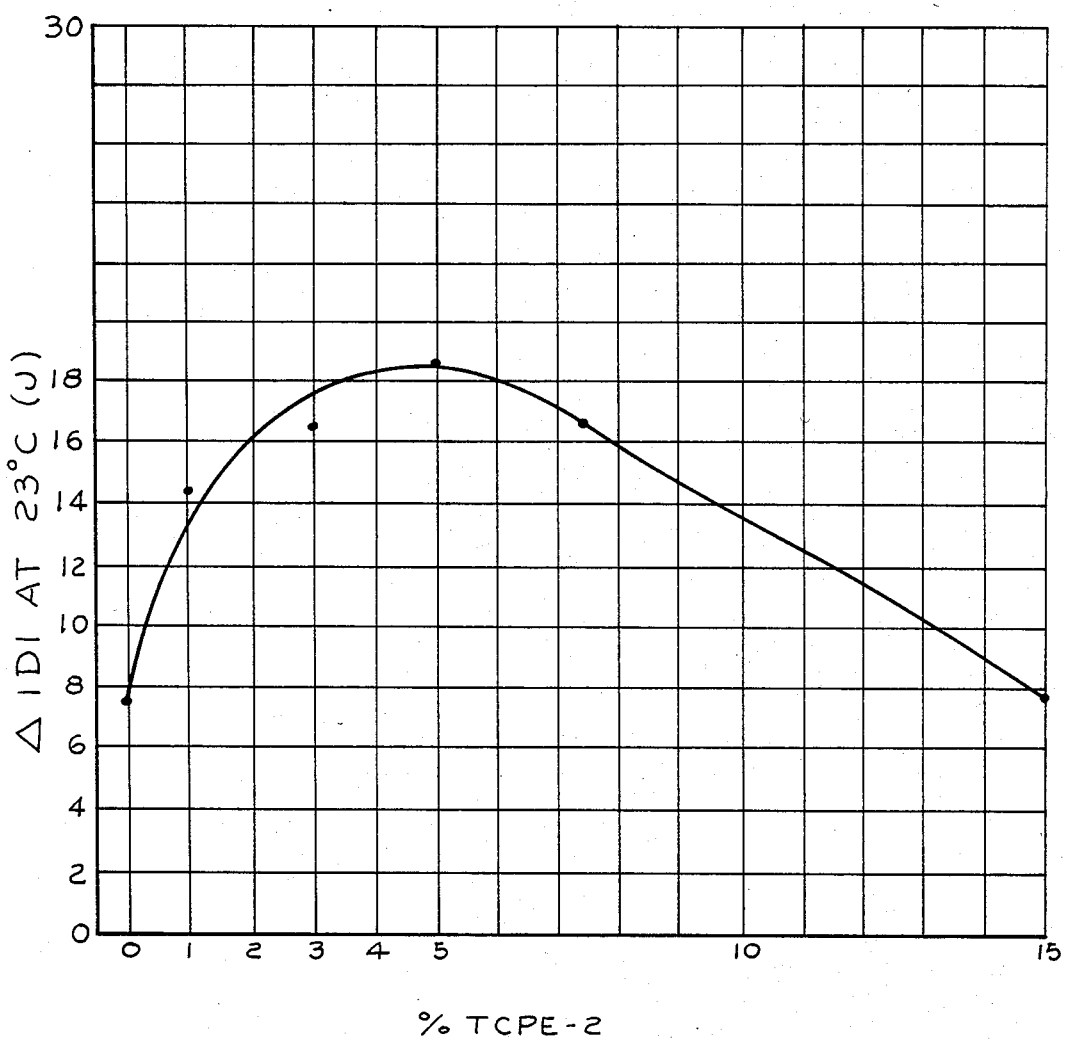

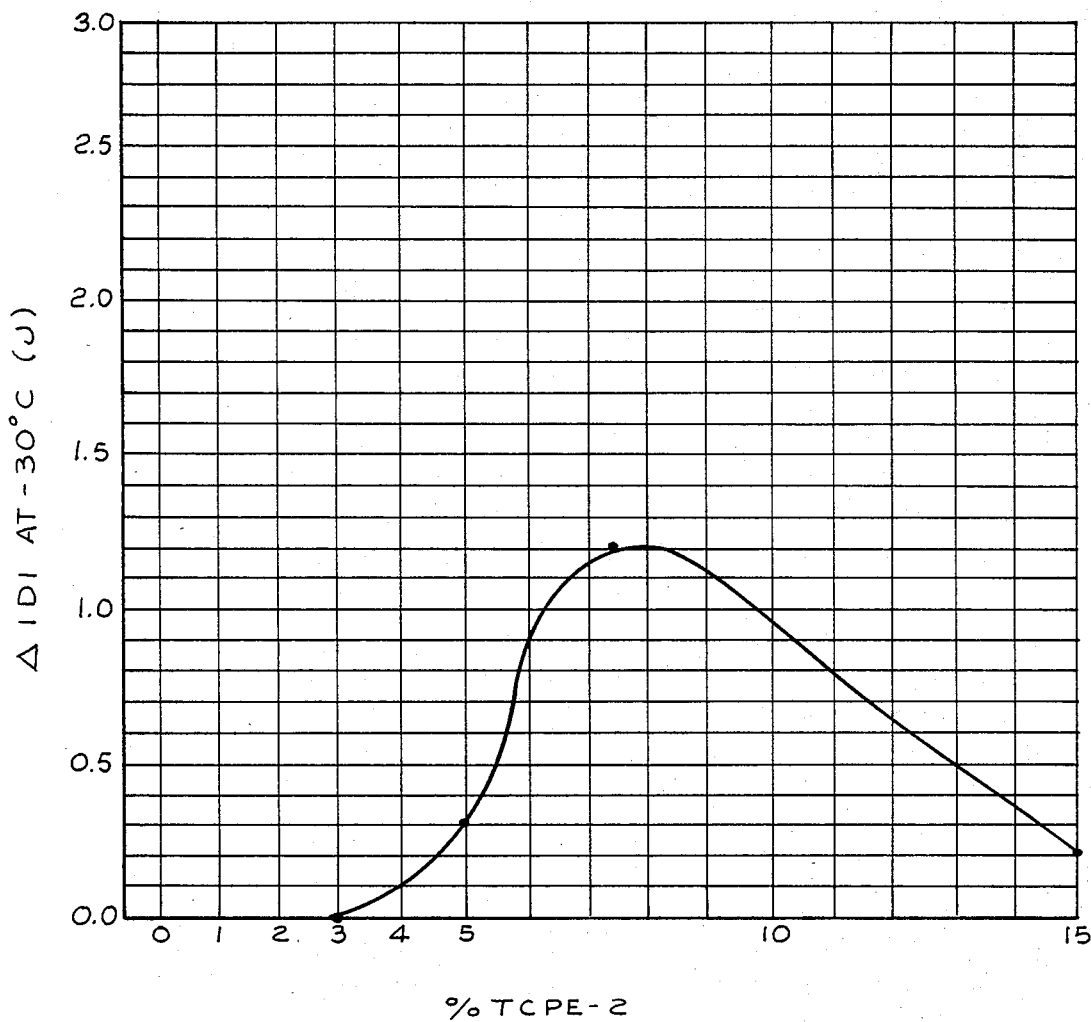

POLYBLENDS OF THERMOPLASTIC COPOLYETHERESTERS AND ACRYLONITRILE-BUTADIENE-STYRENE POLYMERS

BACKGROUND OF THE INVENTION

This invention relates to polyblends and specifically to polyblends of acrylonitrile-butadienestyrene (ABS) graft polymers with certain thermoplastic copolyetherester elastomers capable of conferring on ABS improved impact properties, such as ductility and chemical resistance.

ABS polymers are very well known in the field of molding materials as being suitable for the production of tough, moldable materials with good surface properties. ABS is adapted for use in such diverse fields as automotive parts, housings for major appliances such as refrigerators and washing machines, television cabinets, housings for small appliances such as blenders, mixers, pocket calculators, and radios; telephone sets and containers for foodstuffs.

Certain end-use applications require improved chemical resistance above those obtained with ABS, particularly molded parts that have weld lines at fastening points, such as where screws are held to mount the part. Examples of such applications include housings and fasteners that come in contact with oils or solvents and other related materials. The weld line is particularly susceptible to chemical attack, and stress is often applied when the part is mounted, further weakening the weld line. The addition of certain thermoplastic copolyetherester elastomers to ABS results in a blend with improved chemical resistance, particularly at weld lines. Such molded articles are also suitable for end-use applications which require improved impact and ductility above those obtained in ABS. Examples of such applications include automotive parts and housings for electrical appliances. Of particular importance is low temperature ductility for applications that require ductility over a wide range of temperatures.

DESCRIPTION OF THE CITED ART

ABS is very well known in the art and is described, inter alia, in U.S. Pat. Nos. 3,509,237; 3,509,238; 3,851,014; and 3,903,200. A very comprehensive treatment of this polymer is found in "ABS Plastics" by C. H. Basdekis (Rheinhold 1964). ABS has been blended with a very wide range of other polymers including polyvinyl chloride (U.S. Pat. No. 2,802,809) and polycarbonates (U.S. Pat. No. 3,130,177).

Polyblends of ABS and copolyetherester elastomers are described in Japanese Pat. No. 74686/76. The Japanese patent describes a way to improve copolyetheresters by the addition of 5 to 80 weight percent ABS. The present invention involves the improvement of ABS by the addition of relatively small quantities (1-15 weight percent) of certain thermoplastic copolyetheresters. Copolyetherester elastomers are described below.

SUMMARY OF THE INVENTION

The present invention provides a polyblend comprising:

A. from 1 to 15% by weight of a thermoplastic copolyetherester elastomer with the provision that if the thermoplastic copolyetherester elastomer contains less than 40 percent soft segments, the amount of the thermoplastic copolyetherester elastomer is in the range of from 1 to 10% by weight; and B. from 99 to 85% by weight of a grafted composition comprising a graft polymer of from 20 to 40 parts by weight of a monomer selected from the group consisting of methyl methacrylate and acrylonitrile and 80 to 60 parts by weight of a vinyl aromatic monomer the polymer being grafted onto a substrate rubber having a glass transition temperature below 0° C. wherein the monomers are polymerized in the presence of and grafted onto the substrate rubber, wherein the weight percent of the rubber is in the range from 1 to 60% by weight based on the weight of the composition.

DESCRIPTION OF THE PREFERRED EMBODIMENTS

Thermoplastic copolyetherester elastomers which are suitable for use in the practice of the present invention are defined below. The term "thermoplastic copolyetherester elastomer" as used herein means a segmented polymer comprising about 30% to about 80% by weight of recurring linear etherester (soft) segments derived from difunctional polyether glycol and dicarboxylic acid and about 70% to about 20% by weight of recurring linear ester (hard) segments derived from organic diol and aromatic dicarboxylic acid. Polyether glycols having a number average molecular weight from about 350 to about 6000 are suitable with polyether glycols having a molecular weight between about 800 and 4000 being preferred. The aromatic ester hard segment represents a repeating unit of a fiber-forming polyester having a melting point above 150° C., preferably, about 200° in its fiber-forming molecular weight range, for example, polyethyleneterephthalate and polytetramethyleneterephalate. For further details on the preparation, composition and properties of such segmented thermoplastic copolyetherester elastomers, see U.S. Pat. Nos. 3,023,192; 3,651,014; 3,766,146; 3,775,373; 3,784,520 and 3,891,604, all assigned to E. I. duPont de Nemours and Company, the disclosures of which are hereby incororated by reference. Suitable segmented thermoplastic copolyetherester elastomers derived from terephthalic acid, polytetramethylene ether glycol and 1,4-butanediol may be purchased from duPont under the trademark HYTREL elastomer.

Further information on HYTREL® elastomers is contained in *New Commercial Polymers,* 1969-1975, by Hans-Georg Elias, Midland Macromolecular Institute, Midland, Mich. 48640, translated from the German by Mary M. Exner; Gordon and Breach Science Publishers (New York, London and Paris) at pages 85 to 89, and in "Polymerization Reactions & New Polymers," "Segmented Polyester Thermoplastic Elastomers" by W. K. Witsiepe, published in *Polymerization Reactions & New Polymers* at pages 39 to 59, Amer. Chem. Soc. - Advances in Chemistry Series No.129 (edited by N. J. Platzer) 1973, the disclosures of which are hereby incorporated herein by reference.

The preferred copolyether ester elastomers comprise from about 60 to about 40% by weight of hard segments of polybutylene terephthalate and from about 40 to about 60% by weight of soft segments of polytetramethylene ether terephthalate. The most preferred copolyetherester elastomer is TCPE-2, described below. The amount of copolyetherester in the blend is in the range of 1 to 15 % weight. The preferred range is 1 to 10% by weight and the most preferred range is 3 to 10% by weight.

The grafted ABS type polymers formed by the polymerization of a vinyl aromatic monomer such as styrene and an unsaturated nitrile monomer such as acrylonitrile in the presence of a diene rubber such as polybutadiene. They may be made by mass, suspension or emulsion polymerization techniques. The diene rubber is present as a substrate grafted with a styrene/acrylonitrile superstrate. A styrene/acrylonitrile matrix is usually formed simultaneously with the grafting reaction. Further matrix may be added subsequently in a blending operation to obtain the desired formulation.

Besides the compositions described above, the term "ABS polymer" is often used to cover variations in this formulation through substitution of other copolymerizable monomers, in whole or in part, for one or more of the components of standard ABS. Thus, the acrylonitrile can be wholly or partially substituted for example by methacrylonitrile or wholly substituted by methyl methacrylate forming methyl methacrylate/-butadiene/styrene (MBS); polybutadiene can be replaced with a wide range of other rubbers having a Tg (glass transition temperature) below 0° C. and preferably below −30° C. such as acrylate rubbers, e.g. butyl acrylate or ethylene propylene diene monomer (EPDM) rubbers; and styrene can be replaced by substituted styrene such as halostyrenes, α-methyl styrene and the like. All such variations are embraced by the term ABS polymer as it is used herein.

The styrene and acrylonitrile monomer components of the superstrate graft polymer and matrix polymer are generally present in a weight ratio of from 80:20 to 60:40.

One ABS variation which is particularly useful in polyblends for certain specific end-uses is the production of ABS by controlling the amount of matrix polymer formed during the graft polymerization of the styrene and acrylonitrile components onto the rubber substrate polymer. Additional separately prepared matrix polymer of the same or different composition can be added to the ABS in order to achieve some degree of variation of the properties of the final product. This approach permits some flexibility in. the final composition of the ABS polymer. Thus, the grafted substrate may be for example, polybutadiene grafted with styrene and acrylonitrile while the separately prepared matrix polymer is a copolymer of alpha-methyl-styrene with acrylonitrile.

The grafted rubber may be in the form of particles with a narrow or broad size range or it may contain particles in two different size ranges in accordance with the teachings in U.S. Pat. No. 3,509,237 (incorporated herein by reference), so as to obtain a good balance of strength and good surface qualities.

The amount of rubber substrate (ungrafted basis) in the ABS component is in the range from 1 to 60% and preferably from 1 to 25% based on the total weight of ABS (grafted rubber plus matrix polymer). The most preferred amount of rubber in the ABS component is in the range of 5 to 20% based on the total weight of the ABS.

In addition to the above components the polyblends of the invention can advantageously contain other additives such as plasticizers, antioxidants, stabilizers, flame-retardants, fibers, mineral fibers, dyes, pigments and the like.

The components of the polyblend can be blended together by any convenient process. Usually however they are extrusion blended or compounded in a high intensity blender such as a Banbury Mixer.

FIGURES

FIGS. 1 and 2 show the effect of varying TCPE-2 concentration in the ABS blend on ΔIDI (described below) at 23° C. (FIG. 1) and ΔIDI at −30° C. (FIG. 2).

COMPONENTS USED

ABS-1—prepared by the graft emulsion polymerization of styrene and acrylonitrile in a weight ratio of 70:30 in the presence of polybutadiene. ABS-1 contains 40% by weight of polybutadiene. The weight average molecular weight of the free SAN in the styrene/acrylonitrile graft polymer is in the range from 200,000 to 400,000 as determined by gel permeation chromatography [GPC] using ASTM Method D 3536-76 modified in that 4 columns in series using micro Styragel (Waters Assoc.) packing are used with a nominal exclusion limit of 500A units, 1,000A units, 10,000A units and 100,000A units. The detector is an ultraviolet light detector set at wavelength 254 nm. The test samples are prepared at a concentration of 0.25% weight of polymer in tetrahydrofuran. The sample injection size is 0.2 ml and a flow rate of 2 ml/min. at ambient temperature is used.

The grafted polybutadiene has an average particle size in the range of from 0.1 to 0.25 micron measured as a weight average particle size diameter with centrifugal photosedimentometer (CPSM) by the published procedure of Graves, M. J. et al "Size Analysis of Subsieve Powders Using a Centrifugal Photosedimentometer," British Chemical Engineering 9:742–744 (1964). A Model 3000 Particle Size Analyzer from Martin Sweets Co., 3131 W. Market St., Louisville, KY is used.

ABS-2—prepared by the graft suspension polymerization of styrene and acrylonitrile in a weight ratio of 72:28 in the presence of polybutadiene. ABS-2 contains 14% by weight of polybutadiene. The weight average molecular weight as determined by gel permeation chromatography of the free SAN in the styrene/acrylonitrile graft polymer is in the range from 70,000 to 100,000 and the grafted polybutadiene has an average particle size in the range of from 0.6 to 1.6 microns by CPSM.

SAN-1—prepared by polymerizing a monomer mixture of styrene (S) and acrylonitrile (AN) to produce a SAN polymer having a weight ratio of 77:23.

SAN-2—prepared by polymerizing a monomer mixture of styrene and acrylonitrile to produce a SAN polymer having a weight ratio of 67:33.

TCPE-1—a thermoplastic copolyetherester elastomer which is a block copolymer of short-chain diol terephthalate and long-chain polyether diol terephthalate available from duPont Company, Elastomer Chemicals Department, Wilmington, DE 19898 under the designation HYTREL ® 5556. This material, which comprises about 60% by weight of hard segments of polybutylene terephthalate and about 40% by weight of soft segments of polytetramethylene ether terephthalate, has a Durometer hardness (ASTM D-2240) of 55D, a melting point (ASTM D-2117) of 211° C.; a Vicat Softening Point (ASTM D1525) of 180° C. and flexural modulus (ASTM D790) of 207 megapascals (MPa).

TCPE-2—a thermoplastic copolyetherester elastomer which is a block copolymer of short-chain diol terephthalate and long-chain polyether diol terephthalate available from duPont Company, Elastomer Chemicals Department, Wilmington, DE 19898 under the designation HYTREL ® 4056.

HYTREL ® 4056, which comprises about 42% by weight of hard segments of polybutylene terephthalate and about 58% by weight of soft segments of polytetramethylene ether terephthalate, has a Durometer hardness of 92A/40D; a melting point of 168° C.; a Vicat Softening Point of 112° C. and flexural modulus of 48.3 MPa. TCPE-2 is softer and has a lower flexural modulus than TCPE-1.

TCPE-3—a thermoplastic copolyetherester elastomer which is a block copolymer of short-chain diol terephahalate and long-chain polyether diol terephthalate available from duPont Company, Elastomer Chemicals Department, Wilmington, DE 19898 under the designation HYTREL ® 7246. This material, which comprises about 80% by weight of hard segments of polybutylene terephthalate and about 20% by weight of soft segments of polytetramethylene ether terephthalate, has a Durometer hardness of about 72D; a melting point of 219° C.; a Vicat Softening Point of 207° C. and a flexural modulus of 585 MPa.

SAMPLE PREPARATION AND TEST METHODS

The components used in the working examples are compounded in a Banbury at 180° to 250° C. The resulting blends are injection molded on an Arburg Molding Machine at 220° to 260° C. and 3.44 to 13.8 MPa. Each sample was prepared using 2.5 weight percent Glycolube TS, a glycerol tristearate plasticizer, available from Glyco, and 0.3 weight percent Goodrite 3114, an alkylated phenol antioxidant available from Goodrich, based on the total weight of the polyblend. The molded samples are subjected to the following tests:

VICAT Softening Point (ASTM-D-1525-76-Rate B) a one (1) kg test using a heat rate of 120° C. per hour with results given in °C.;

DTUL (ASTM-D-256 Method A) with sample dimension 12.7 cm×1.27 cm×1.27 cm and the maximum fiber stress of 1820 kPa with results given in °C.;

Izod Impact (ASTM D-256-56) with sample dimensions 6.35 cm×1.27 cm×1.27 cm, with results given in Joules/meter (J/m);

Gardner Impact using a 2.54 mm thick sample, a 6.35 mm diameter dart and a 14.3 mm diameter ring with results given in Joules (J);

Tensile (ASTM-D-638) results given in megapascals (MPa);

Flexural Strength (ASTM-D-790) the samples are molded as tensile bars and the clamp portion of the bar removed to give a 1.27 cm×12.7 cm×0.318 cm sample. A 0.9% strain is applied by clamping both ends of the sample to a mandrel with a radius of 17.8 cm. The treated samples have Scandia #2 cutting oil (a phthalic ester mineral oil) applied by covering the sample with tissue paper saturated with oil for 24 hours. The untreated samples have no oil applied. The results are given in megapascals (MPa). The percent retention is the flexural strength of the treated samples divided by the flexural strength of the untreated sample multiplied by 100.

Chemical Resistance—1.27 cm strips are cut with a sharp knife (the edges not sanded) from 7.62 cm by 10.2 cm×0.254 cm plaque, and a 1% strain level is applied by clamping both ends of the sample to a mandrel with a radius of 12.57 cm. Scandia #2 cutting oil (a phthalic ester mineral oil) is applied by covering the sample with tissue paper saturated with oil and the time to crack or fail is measured, with results given in hours (Hrs). A "No failure" rating in the Examples indicates no failure within 24 hours.

Multiaxial Inverted Dart Impact (IDI)—a modification of the test as described in Society of Plastics Engineers National Technical Conference "*Plastics in Surface Transportation*" Nov. 12–14, 1974, Detroit, Mich. page 238. In the modified test, instead of the dart being attached to the slider and striking the sample, the sample holder is attached to the slider and strikes the instrumented dart. The rotary potentiometer is not used. The instrumented dart used is 1.27 cm in diamter, and the sample strikes the instrumented dart at a velocity of 111.76 m/min. The samples are injection molded into 7.62 cm×10.16 cm×0.254 cm and then are cut into 3.81 cm×5.08 cm×0.254 cm pieces for testing. Results are given in Joules (J).

The energy to maximum for IDI is the energy needed to achieve the yielding of a ductile sample. The energy to failure represents the energy necessary to cause a failure of a sample. The testing is run at 23° C. and −30° C. except in Table 4 or where otherwise designated they are run at −20° C. to determine the effect of temperature on performance of the polymer. The difference (Δ) between the energy to fail and the energy to maximum indicates the ductility of the sample. The larger the difference (Δ) the more ductile is the sample.

WORKING EXAMPLES AND TEST RESULTS

In Examples 1 to 16 various polyblends are prepared and tested and the results tabulated in Tables 1 to 4. Control Examples are identified as C-1 to C-8 are included in Tables 1 to 4 for comparison purposes. The amounts of the polymeric components (A) and (B) used are parts by weight and, except for minor deviations in certain examples, are calculated to add up to a 100 parts by weight total.

CONTROLS 1 AND 2 AND EXAMPLES 1, 2 AND 3

Control 1 and Examples 1 and 2 shown in Table 1 illustrate the effect of adding increasing amounts of TCPE-2 to ABS. The addition of 7.5 weight percent TCPE-2 to ABS (Example 1) has no substantial effect on Gardner impact, Vicat and ΔIDI at 23° C. An improvement of 5.2 on ΔIDI at −30° C. is noted. Likewise, an improvement of chemical resistance of from 6 hours to 9 hours for cracking and 9 hours to 17 hours to fail are seen with the addition of 7.5 weight percent TCPE-2. When 15.0 weight percent TCPE-2 is added to ABS (Example 2) there is no substantial change in Gardner impact, or the ΔIDI at 23° C. The ΔIDI at −30° C. increases 9.5 J and the chemical resistance is markedly improved, with no cracking or failure observed after 24 hours.

Control Example C-2 and Example 3 show the effect of adding 10 weight percent TCPE-2 to ABS. The ΔIDI at 23° C. shows no change, but the ΔIDI at −20° C. shows an improvement of 8.7 J. Chemical resistance was not measured on these samples.

TABLE 1

| Varying TCPE Concentration in ABS-Type Polyblends | | | | | |
|---|---|---|---|---|---|
| | C-1 | Ex 1 | Ex 2 | C-2 | Ex 3 |
| ABS-1 | 45.0 | 41.5 | 38.0 | 37.7 | 33.9 |
| ABS-2 | 23.0 | 21.5 | 20.0 | 12.3 | 11.0 |
| SAN-1 | 32.0 | 29.5 | 27.0 | — | — |
| SAN-2 | — | — | — | 50.0 | 45.0 |

TABLE 1-continued

Varying TCPE Concentration in ABS-Type Polyblends

|  | C-1 | Ex 1 | Ex 2 | C-2 | Ex 3 |
|---|---|---|---|---|---|
| TCPE-2 | — | 7.5 | 15.0 | — | 10 |
| Gardner Impact (J) | 16.6 | 16.6 | 15.9 | — | — |
| IDI at 23° C. (J) | | | | | |
| Energy to fail | 33.4 | 33.6 | 30.8 | 38.2 | 36.0 |
| Energy to max. | 20.0 | 20.0 | 16.8 | 21.2 | 19.0 |
| Δ | 13.45 | 13.6 | 14.0 | 17.0 | 17.0 |
| IDI at −30° C. (J) | | | | | |
| Energy to fail | 15.1 | 24.5 | 30.6 | 23.6* | 36.8* |
| Energy to max. | 14.7 | 18.9 | 20.7 | 19.1 | 23.6 |
| Δ | .4 | 5.6 | 9.9 | 4.5 | 13.2 |
| VICAT (°C.) | 104 | 104 | 105 | — | — |
| Chemical Resistance (Hrs) | | | | | |
| Crack | 6 | 9 | no failure | — | — |
| Fail | 9 | 17 | no failure | — | — |

*IDI measured at −20° C.

CONTROL EXAMPLES 3 TO 7 AND EXAMPLES 4 TO 6

Control Examples C-3 to C-6 tabulated in Table 2 show the effect of increasing the rubber content of ABS from 0 to 22.5 weight percent. The Izod, Gardner and IDI all show a generally increasing trend with increasing rubber content. The Gardner and ΔIDI at 23° C. show a maximum at 15% rubber. Tensile strength and elongation to fail decrease with increasing rubber content. Control Example C-7 shows the effect of 15 weight percent TCPE-2 on styrene-acrylonitrile (SAN-2). When compared to Control C-3, Control C-7 shows an improvement in Izod, Gardner and ΔIDI at 23° C. A decrease is seen in Tensile strength.

Examples 4, 5 and 6 show the effect of adding 15 weight percent TCPE-2 to ABS with increasing rubber content. The greatest improvement is noted in comparing Example 4 to Control C-4 where both have a low ABS rubber content (7.5 weight percent). With the addition of 15 weight percent TCPE-2 (Example 4) the Izod value doubled and Gardner and ΔIDI increased over those values in Control C-4. Tensile yield decreased and percent elongation remained about the same. Comparing Example 5 with 15.0 weight percent rubber and 15 weight percent TCPE-2 to Control C-5, an increase in Izod, but a decrease in Gardner, ΔIDI at 23° C. and Tensile strength is seen. An increase in ΔIDI at −30° C. and elongation to fail is observed. Comparing Example 6 with 22.5 weight percent rubber and 15 percent TCPE-2 with Control C-6, an increase in Izod, ΔIDI at −30° C. and elongation to fail is observed, but a decrease in Gardner Impact, ΔIDI at 23° C. and tensile strength is also observed. Therefore, the addition of TCPE-2 to ABS has the greatest effect on ABS with low rubber content (less than 22.5 weight %). At higher rubber content (22.5 weight %) small improvements are observed in some properties (Izod, ΔIDI at −30° C. and elongation to fail) with increasing loss of other properties (Gardner impact, ΔIDI at 23° C. and tensile strength) is observed.

TABLE 2

Varying Rubber & TCPE-Content of Polyblends

|  | C-3 | C-4 | C-5 | C-6 | C-7 | Ex 4 | Ex 5 | Ex 6 |
|---|---|---|---|---|---|---|---|---|
| ABS-1 | — | 18.5 | 37.0 | 55.5 | — | 18.5 | 37.0 | 55.5 |
| ABS-2 | — | 5.5 | 11.0 | 16.7 | — | 5.5 | 11.0 | 16.7 |
| SAN-2 | 100 | 76.0 | 52.0 | 27.8 | 85.0 | 61.0 | 37.0 | 12.8 |
| TCPE-2 | — | — | — | — | 15.0 | 15.0 | 15.0 | 15.0 |
| Rubber in ABS | — | 7.5 | 15.0 | 22.5 | — | 7.5 | 15.0 | 22.5 |
| Izod Impact (J/m) | 27.1 | 96.5 | 352 | 477 | 315 | 192 | 430 | 503 |
| Gardner Impact (J) | <0.7 | 11.4 | 21.6 | 17.2 | 1.02 | 14.2 | 14.2 | 11.2 |
| IDI at 23° C. (J) | | | | | | | | |
| Energy to fail | .25 | 19.2 | 37.7 | 33.0 | 0.82 | 24.3 | 30.2 | 28.5 |
| Energy to max | .24 | 14.6 | 19.4 | 17.9 | 0.79 | 15.5 | 16.9 | 14.2 |
| Δ | 0.01 | 4.6 | 18.3 | 15.1 | 0.03 | 8.81 | 13.2 | 14.3 |
| IDI at −30° C. (J) | | | | | | | | |
| Energy to fail | — | 4.12 | 23.3 | 35.5 | — | 12.2 | 30.2 | 29.8 |
| Energy to max | — | 4.08 | 18.9 | 23.4 | — | 11.2 | 19.9 | 16.6 |
| Δ | — | 0.05 | 4.41 | 12.1 | — | 1.01 | 10.3 | 13.2 |
| Tensile Strength (MPa) | | | | | | | | |
| (Yield) | 73.6 | 47.0 | 39.2 | 33.5 | 59.8 | 44.2 | 34.3 | 26.0 |
| (Fail) | — | 37.7 | 31.7 | 27.1 | 38.8 | 32.9 | 26.2 | 20.9 |
| % Elongation to fail | — | 16 | 17 | 11 | 14 | 17 | 31 | 54 |

CONTROL EXAMPLE C-8 AND EXAMPLES 7 TO 13

Control example C-8 and Examples 7 to 13, which are tabulated in Table 3, show the effect of adding increasing increments of TCPE-2 to ABS. Examples 12 and 13 show the effect of 15 weight percent TCPE-1 and TCPE-3 on ABS.

Izod impact and ΔIDI at −30° C. increase as the weight percent TCPE-2 in the ABS increases, reaching a maximum at 7.5 weight percent TCPE-2. ΔIDI at 23° C. likewise increases with TCPE-2 concentration, reaching a maximum at 5 weight percent TCPE-2. Flexural strength fluctuates with TCPE-2 concentration, but the percent retention of flexural strength after exposure to cutting oil is improved, indicating improved chemical resistance. With the exception of chemical resistance, all performances properties show a decrease when greater than 7.5 weight % TCPE-2 is added, indicating an optimum concentration of TCPE-2 between 1 and 15 weight % and a corresponding decrease in performance properties at greater than 15 weight %. The effect of varying TCPE-2 concentration on ΔIDI is shown in FIGS. 1 and 2.

Example 12 shows the effect of adding 15 weight percent TCPE-1 to ABS. There is a small improvement in Izod and chemical resistance when compared to ABS with no TCPE (Control Example C-8), but lower performance when compared to ABS with 15 weight percent TCPE-2 (Example 11). The addition of 15 weight percent TCPE-3 to ABS results in a blend with lower performance when compared to ABS with no TCPE (Control Example C-8).

EXAMPLES 14 TO 16 AND CONTROL EXAMPLE C-8

Examples 14 to 16, given in Table 4, show the effect of adding TCPE-1, -2 and -3 at a concentration of 5 weight percent to ABS. Izod, Tensile Modulus and ΔIDI at 23° C. showed improvement in the order to TCPE-2, TCPE-1, and TCPE-3. DTUL went from 95.1° C. with TCPE-2 to 96.2° C. with TCPE-3. Vicat is virtually unchanged. Tensile yield and fail shows a little difference, but the percent elongation for ABS with TCPE-3 is 100 percent greater than that of blends with TCPE-1 or -2. With the exception of Izod, ABS blended with TCPE-3 appeared poorer than ABS with no TCPE (Control Example 8).

The addition of 5% TCPE-2 to ABS results in the greatest improvement of most properties measured. The addition of TCPE-1 or TCPE-3 to ABS results in smaller improvements in fewer properties.

Comparing Examples 15 and 16 to Examples 12 and 13 shows an improvement in performance properties when lower concentration (5 weight %) of TCPE-1 and TCPE-3 are blended with ABS than when higher (15 weight %) concentration are used, indicating an optimum between 1 and 15% TCPE concentration in these particular systems.

TABLE 3

| | Varying TCPE in Polyblends | | | | | | | |
|---|---|---|---|---|---|---|---|---|
| | C-8 | Ex 7 | Ex 8 | Ex 9 | Ex 10 | Ex 11 | Ex 12 | Ex 13 |
| ABS-1 | 18.5 | 18.3 | 17.9 | 17.6 | 17.1 | 15.7 | 15.7 | 15.7 |
| ABS-2 | 5.4 | 5.35 | 5.2 | 5.1 | 5.0 | 4.6 | 4.6 | 4.6 |
| SAN-2 | 76.0 | 75.2 | 73.7 | 72.2 | 70.3 | 64.6 | 64.6 | 64.6 |
| TCPE-2 | — | 1 | 3 | 5 | 7.5 | 15 | — | — |
| TCPE-1 | — | — | — | — | — | — | 15 | — |
| TCPE-3 | — | — | — | — | — | — | — | 15 |
| Izod Impact (J/m) | 84.1 | 111 | 125 | 159 | 180 | 144 | 99.8 | 39.0 |
| IDI @ 23° C. (J) | | | | | | | | |
| Energy to fail | 23.3 | 34.0 | 36.4 | 38.8 | 35.3 | 22.8 | 21.7 | 5.2 |
| Energy to max | 15.9 | 19.7 | 19.9 | 20.2 | 18.4 | 14.9 | 15.0 | 5.1 |
| Δ | 7.35 | 14.4 | 16.5 | 18.6 | 16.8 | 7.91 | 6.7 | 0.1 |
| IDI @ −30° C. (J) | | | | | | | | |
| Energy to fail | 3.7 | 6.2 | 8.0 | 8.2 | 14.0 | 9.0 | 3.2 | 1.0 |
| Energy to max | 3.7 | 6.2 | 8.0 | 7.9 | 12.8 | 8.8 | 3.2 | 1.0 |
| Δ | 0 | 0 | 0 | 0.3 | 1.2 | 0.2 | 0 | 0 |
| Flexural Strength* (MPa) | | | | | | | | |
| Original | 95.8 | 96.4 | 92.3 | 98.9 | 93.8 | 90.8 | 94.3 | — |
| After 24 hrs of Chemical Resistance testing | 87.2 | 89.9 | 95.8 | 94.3 | 100.5 | 91.3 | 90.3 | — |
| % Retention | 91 | 93 | 100+ | 95 | 100+ | 100+ | 96 | — |

*Samples were single gate molded so that no weld line occurred in the center of the sample.

TABLE 4

| | Varying TCPE in Polyblends | | | |
|---|---|---|---|---|
| | Ex 14 | Ex 15 | Ex 16 | C-8 |
| ABS-1 | 17.6 | 17.6 | 17.6 | 18.5 |
| ABS-2 | 5.1 | 5.1 | 5.1 | 5.4 |
| SAN-2 | 72.2 | 72.2 | 72.2 | 76.0 |
| TCPE-2 | 5 | — | — | — |
| TCPE-1 | — | 5 | — | — |
| TCPE-3 | — | — | 5 | — |
| Izod (J/m) | 156 | 122 | 99.2 | 84.1 |
| DTUL (°C.) | 95.1 | 95.8 | 96.2 | — |
| VICAT (°C.) | 108.8 | 108.2 | 108.4 | — |
| Tensile (MPa) | | | | |

TABLE 4-continued

| | Varying TCPE in Polyblends | | | |
|---|---|---|---|---|
| | Ex 14 | Ex 15 | Ex 16 | C-8 |
| Yield | 50.8 | 51.1 | 50.8 | — |
| Fail | 39.1 | 39.3 | 38.3 | — |
| % Elongation | 7 | 8 | 16 | — |
| Modulus | 2496 | 2703 | 2944 | — |
| IDI at 23° C. (J) | | | | |
| Energy to Fail | 34.6 | 27.7 | 18.3 | 23.3 |
| Energy to max. | 19.8 | 16.7 | 13.4 | 15.9 |
| Δ | 14.8 | 11.0 | 4.9 | 7.35 |
| IDI at −20° C. (J) | | | | |
| Energy to Fail | 6.89 | 3.96 | 2.82 | 3.7* |
| Energy to max. | 6.78 | 3.84 | 2.71 | 3.7 |
| Δ | 0.11 | 0.12 | 0.11 | 0 |

*IDI at −30° C.

We claim:

1. A polyblend comprising:
   A. from 1 to 15% by weight of a thermoplastic copolyetherester elastomer with the provision that if the thermoplastic copolyetherester elastomer contains less than 40% by weight soft segments, the amount of the thermoplastic copolyetherester elastomer is in the range of from 1 to 10% by weight; and
   B. from 99 to 85% by weight of a grafted polymer composition comprising a graft polymer of from 20 to 40 parts by weight of a monomer selected from the group consisting of methyl methacrylate and acrylonitrile and 80 to 60 parts by weight of a vinyl aromatic monomer, the polymer being grafted onto a substrate rubber having a glass transition temperature below 0° C. wherein the monomers are polymerized in the presence of and grafted onto the substrate rubber, wherein the weight percent of the rubber is in the range from 1 to 60% by weight based on the weight of the composition;

and wherein the weight percent for Components (A) and (B) are based on the total amount of Components (A) and (B) in the polyblend.

2. A polyblend as in claim 1 wherein the copolyetherester is in the range from 1 to 10% by weight and the rubber content of Component B is 1 to 25 weight percent.

3. A polyblend as in claim 1 wherein the copolyetherester is in the range from 3 to 10% by weight and the rubber content of Component B is 5 to 20 weight percent.

4. A polyblend as in claim 1 wherein the copolyetherester comprises a polytetramethylene ether terephthalate soft segment and a polybutylene terephthalate hard segment.

5. A polyblend as in claim 1 wherein the grafted polymer of Component B is a graft polymer of styrene and acrylonitrile onto a butadiene rubber.

6. A polyblend comprising:
A. from 1 to 15% by weight of a thermoplastic copolyetherester elastomer comprising a polytetramethylene ether terephthalate soft segment and a polybutylene terephthalate hard segment with the provision that if the thermoplastic copolyetherester elastomer contains less than 40% by weight soft segments, the amount of the thermoplastic copolyetherester elastomer is in the range of from 1 to 10% by weight; and
B. from 99 to 85% by weight of a grafted polymer composition comprising a graft polymer of from 20 to 40 parts by weight of acrylonitrile or methyl methacrylate and 80 to 60 parts by weight of styrene, the polymer being grafted onto a butadiene rubber having a glass transition temperature below 0° C. wherein the monomers are polymerized in the presence of and grafted onto the substrate rubber, wherein the weight percent of the rubber is in the range from 1 to 60% by weight based on the weight of the composition;

and wherein the weight percent for Components (A) and (B) are based on the total amount of Components (A) and (B) in the polyblend.

7. A polyblend as in claim 6 wherein the copolyetherester is in the range from 1 to 10% by weight and the amount of rubber of Component B is in the range from 1 to 25 weight percent.

8. A polyblend according to claim 6 wherein the copolyetherester comprises a polytetramethylene ether terephthalate soft segment and a polybutylene terephthalate hard segment; and wherein the grafted polymer is a graft polymer of styrene and acrylonitrile onto a butadiene rubber.

9. A polyblend according to claim 6 wherein the copolyetherester comprises from about 60 to about 40 percent by weight of hard segments of polybutylene terephthalate and from about 40 to about 60 percent by weight of soft segments of polytetramethylene ether terephthalate.

10. Molded and extruded articles prepared from a polyblend comprising:
A. from 1 to 15% by weight of a thermoplastic copolyetherester elastomer with the provision that if the thermoplastic copolyetherester elastomer contains less than 40% by weight soft segments, the amount of the thermoplastic copolyetherester elastomer is in the range of from 1 to 10% by weight; and
B. from 99 to 85% by weight of a grafted polymer composition comprising a graft polymer of from 20 to 40 parts by weight of a monomer selected from the group consisting of methyl methacrylate and acrylonitrile and 80 to 60 parts by weight of a vinyl aromatic monomer, the polymer being grafted onto a substrate rubber having a glass transition temperature below 0° C. wherein the monomers are polymerized in the presence of and grafted onto the substrate rubber, wherein the weight percent of the rubber is in the range from 5 to 60% by weight based on the weight of the composition;

and wherein the weight percent for Components (A) and (B) are based on the total amount of Components (A) and (B) in the polyblend.

* * * * *

UNITED STATES PATENT AND TRADEMARK OFFICE
CERTIFICATE OF CORRECTION

PATENT NO. : 4,508,870
DATED : APRIL 2, 1985
INVENTOR(S) : DANIEL L. DUFOUR, WILLIAM J. JONES

It is certified that error appears in the above-identified patent and that said Letters Patent are hereby corrected as shown below:

Column 1, line 9, "acrylonitrile-butadienestyrene" should read --acrylonitrile-butadiene-styrene--

Column 2, line 41, "incororated" should read --incorporated--

Column 6, line 12 "diamter" should read --diameter--

Signed and Sealed this

First Day of October 1985

[SEAL]

Attest:

DONALD J. QUIGG

Attesting Officer

Commissioner of Patents and Trademarks—Designate